US008323020B2

(12) United States Patent
Helie et al.

(10) Patent No.: US 8,323,020 B2
(45) Date of Patent: Dec. 4, 2012

(54) MACHINE FOR MANUFACTURING A SPRAY HEAD

(75) Inventors: Arnaud Helie, La Saussaye (FR); Philippe Herouin, Acquigny (FR)

(73) Assignee: Aptar France SAS, le Neubourg (FR)

( * ) Notice: Subject to any disclaimer, the term of this patent is extended or adjusted under 35 U.S.C. 154(b) by 63 days.

(21) Appl. No.: 12/549,202

(22) Filed: Aug. 27, 2009

(65) Prior Publication Data

US 2010/0102477 A1 Apr. 29, 2010

Related U.S. Application Data

(62) Division of application No. 10/565,855, filed as application No. PCT/FR2004/002005 on Jul. 27, 2004, now abandoned.

(30) Foreign Application Priority Data

Aug. 4, 2003 (FR) ...................................... 03 09628

(51) Int. Cl.
*B29C 45/26* (2006.01)
*B29C 45/33* (2006.01)

(52) U.S. Cl. ................. 425/577; 264/328.1; 264/328.12

(58) Field of Classification Search ........................ None
See application file for complete search history.

(56) References Cited

U.S. PATENT DOCUMENTS 2,904,263 A 9/1959 Tate et al.
3,635,406 A * 1/1972 Scheindel ..................... 239/490
3,680,793 A 8/1972 Tate et al.
4,020,979 A 5/1977 Shay et al.
4,367,847 A * 1/1983 Bayer ........................... 239/337
4,673,110 A 6/1987 Workum
4,805,839 A * 2/1989 Malek ........................... 239/337
5,358,179 A 10/1994 Lund et al.
5,378,422 A 1/1995 Musiel et al.
5,664,732 A 9/1997 Smolen, Jr. et al.
6,488,413 B1 12/2002 Wan
6,533,196 B1 3/2003 Ouin et al.
6,569,370 B1 5/2003 Amin et al.

FOREIGN PATENT DOCUMENTS

EP 1 206 972 A 5/2002
FR 1 257 003 A 3/1961
FR 2 122 053 A 8/1972
FR 2 446 311 A1 8/1980
FR 2 774 367 A1 8/1999

OTHER PUBLICATIONS

International Preliminary Report on Patentability.
International Search Report dated Jan. 24, 2005.

* cited by examiner

*Primary Examiner* — Edmund H. Lee
(74) *Attorney, Agent, or Firm* — Sughrue Mion, PLLC

(57) ABSTRACT

A fluid spray head comprising an expulsion channel provided with a spray orifice (1) and a spray profile (10) formed in an end wall of said expulsion channel, said spray profile (10) comprising non-radial spray channels (11) opening out to a central spray chamber (12) disposed directly upstream from said spray orifice (1), the central axis (X) of said spray orifice (1) being offset from the central axis (Y) of the spray chamber (12) by a distance that is less than 0.12 mm, and preferably less than 0.08 mm.

8 Claims, 3 Drawing Sheets

MACHINE FOR MANUFACTURING A SPRAY HEAD

CROSS REFERENCE TO RELATED APPLICATIONS

This is a divisional application of application Ser. No. 10/565,855 filed Feb. 26, 2007, now abandoned, which is a National Stage Application of PCT Application No. PCT/FR04/02005 filed Jul. 27, 2004, which claims foreign priority to FR 03 09628, filed on Aug. 4, 2003. The entire disclosure of application Ser. No. 10/565,855, PCT/FR04/02005, FR 03 09628 are hereby incorporated by reference.

BACKGROUND OF THE INVENTION (1) Field of the Invention

The present invention relates to a fluid spray head and to a machine for manufacturing such a head.

(2) Description of Related Art

Fluid dispenser heads are well known, in particular in the field of pharmacy. In order to dispense a fine spray, the head generally includes a spray profile disposed just upstream from the spray orifice. The characteristics of the spray, in particular the size distribution of the droplets and the reproducibility of such characteristics, are largely dependent on the shape of said spray profile. It turns out that in most fluid dispenser devices, in particular of medicines, the performance is not very consistent because of manufacturing tolerances during molding of the head. In particular, this is explained by the very small dimensions required in particular for the spray orifice, which implies using punches that are relatively fragile. In existing devices, the spray profile is molded inside the head by means of a core pin that is inserted into a head cavity, and that includes, on it front face, a profile that is complementary to the spray profile to be made in the end face of the expulsion channel formed inside the head. The punch used to make the spray orifice is generally provided on the end wall of the cavity for molding the head. Thus, during injection, which is never completely concentric, substantial stresses are exerted on said punch, which, because of its small dimensions, is displaced relative to the pin defining the profile. This causes the central axis of the spray orifice to be offset from the central axis of the spray chamber. Such offset can be substantial, and can in particular vary greatly from one head to another.

This prevents consistent spray characteristics from being obtained.

BRIEF SUMMARY OF THE INVENTION

An object of the present invention is to provide a fluid spray head that does not have the above-mentioned drawbacks.

More particularly, an object of the present invention is to provide a fluid spray head that has fluid spray characteristics and performance that are consistent and reproducible for all of the heads coming from a common mold.

Another object of the present invention is to provide a fluid spray head that is simple and inexpensive to manufacture and to assemble.

The present invention thus provides a fluid spray head comprising an expulsion channel provided with a spray orifice and a spray profile formed in an end wall of said expulsion channel, said spray profile comprising non-radial spray channels leading to a central spray chamber disposed directly upstream from said spray orifice, the spray head being characterized in that the central axis of said spray orifice is offset from the central axis of the spray chamber by a distance that is less than 0.12 mm, and preferably less than 0.08 mm.

Advantageously, said spray chamber has a diameter of 1 mm.

Advantageously, said spray orifice has a diameter of 0.3 mm.

The present invention also provides a set of spray heads manufactured from a common mold cavity, said heads being made as described above.

Advantageously, the standard deviation of the offset of the central axis of the spray orifice relative to the central axis of the spray chamber for all of the spray heads coming from a common mold cavity is less than 0.03 mm, and advantageously less than 0.01 mm.

The present invention also provides a fluid dispenser device including a head as described above.

The present invention also provides a machine for manufacturing a spray head as described above. The machine includes at least one mold provided with at least one mold cavity of said head, said machine including a core pin for each mold cavity, the front face of said pin incorporating a profile that is complementary to the spray profile of the head, said profile being made up of projections forming non-radial channels and the spray chamber, said pin further incorporating a punch so as to form the dispenser orifice.

Advantageously, said punch is removable from said pin, making it possible to replace said punch without having to change the pin. This makes it possible to change only the punch when said punch breaks because of stresses during molding, without having to change the entire pin, as would be necessary if the punch was made integrally with said pin.

Advantageously, said punch is secured to a needle that extends longitudinally inside the pin over a substantial fraction of its length.

This embodiment makes it easier to insert the punch, and in particular to extract the punch from the pin when it is necessary to replace it.

BRIEF DESCRIPTION OF THE DRAWINGS

Other characteristics and advantages of the present invention appear more clearly from the following detailed description of an advantageous embodiment thereof, given by way of non-limiting example, and with reference to the accompanying drawings, and in which.

DETAILED DESCRIPTION OF THE PREFERRED EMBODIMENTS

The present invention applies to any type of fluid spray head. However, the present description is made with reference to an elongate head, e.g. a nasal dispenser head, including a spray orifice directed along the axis of the head. Naturally, the present invention could apply to any type of head, and in particular heads in which the spray is dispensed transversally.

Figure 1:
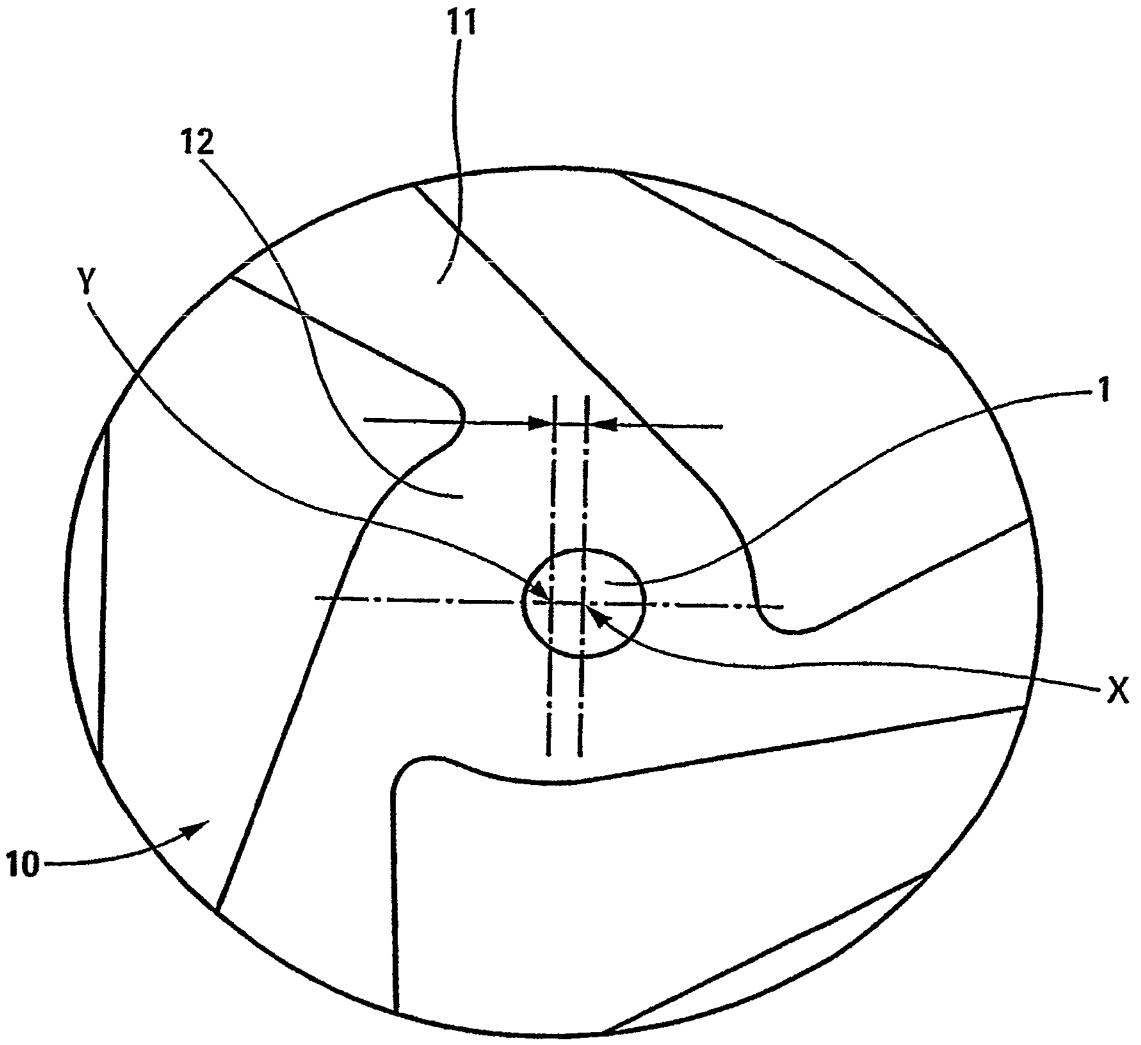
FIG. 1 is a diagrammatic view in horizontal section through the spray profile of a dispenser head of the present invention.

In the invention, the fluid spray head includes an expulsion channel (not shown) that is provided with a spray orifice 1 and with a spray profile 10 that is disposed upstream from said spray orifice 1. The spray profile 10 is formed in the end wall of the expulsion channel, and, in known manner, comprises non-radial spray channels 11 leading into a central spray chamber 12 disposed directly upstream from said spray orifice 1. The channels can be three in number, as shown in FIG. 1, but some other configuration can be envisaged. An insert 20 is generally provided in said expulsion channel so as to limit the dead volume and form a cover for said spray profile 10. The insert is advantageously of simple and elongate shape, such as a needle, and it is inserted through the inside of the head, thus forming an internal nozzle. This avoids any risk of the nozzle being expelled while the device is being actuated. The spray profile is preferably provided in the end of the head, such that the head is formed of only two parts, an external part forming the head, and an internal part forming the insert. Thus, the fluid flowing through the expulsion channel around said insert reaches, at the front face of said insert, the non-radial channels 11 in such a manner that it swirls into the spray chamber 12 before being expelled through the spray orifice 1 in the form of spray.

The present invention is characterized by the fact that, as far as possible, the central axis X of the spray orifice 1 is identical to the central axis Y of the spray chamber 12. More precisely, the two axes X and Y are offset by a distance that is less than 0.12 mm, and preferably less than 0.08 mm. A particularly advantageous embodiment relates to a dispenser head in which the spray chamber 12 has a diameter of about 1 mm, and the spray orifice 1 has a diameter of about 0.3 mm. It turns out that the more the axes X and Y are offset the worse the performance of the spray. In addition, the consistency of the characteristics and of the performance of the spray is affected when the offset between the axes varies from one head to another. Unfortunately, with standard methods in which the punch forming the spray orifice 1 is secured to the cavity for molding the head and not to the core pin, as explained below, heads coming from a common mold cavity present substantial deviations with regard to the offset between the axes X and Y.

In contrast, the present invention advantageously envisages that spray heads coming from a common mold cavity present a standard deviation, with regard to the offset between the central axis X of the spray orifice 1 and the central axis Y of the spray chamber 12, that is less than 0.3 mm, advantageously less than 0.02 mm, and preferably less than 0.01 mm. The relatively small offset values, together with the standard deviation that is much smaller than the standard deviation that currently exists, are obtained with a method and a manufacturing machine such as that described below, in which the punch defining the spray orifice 1 is formed so as to be secured to the pin that is disposed inside the head cavity in order to define the spray profile.

Figure 6:
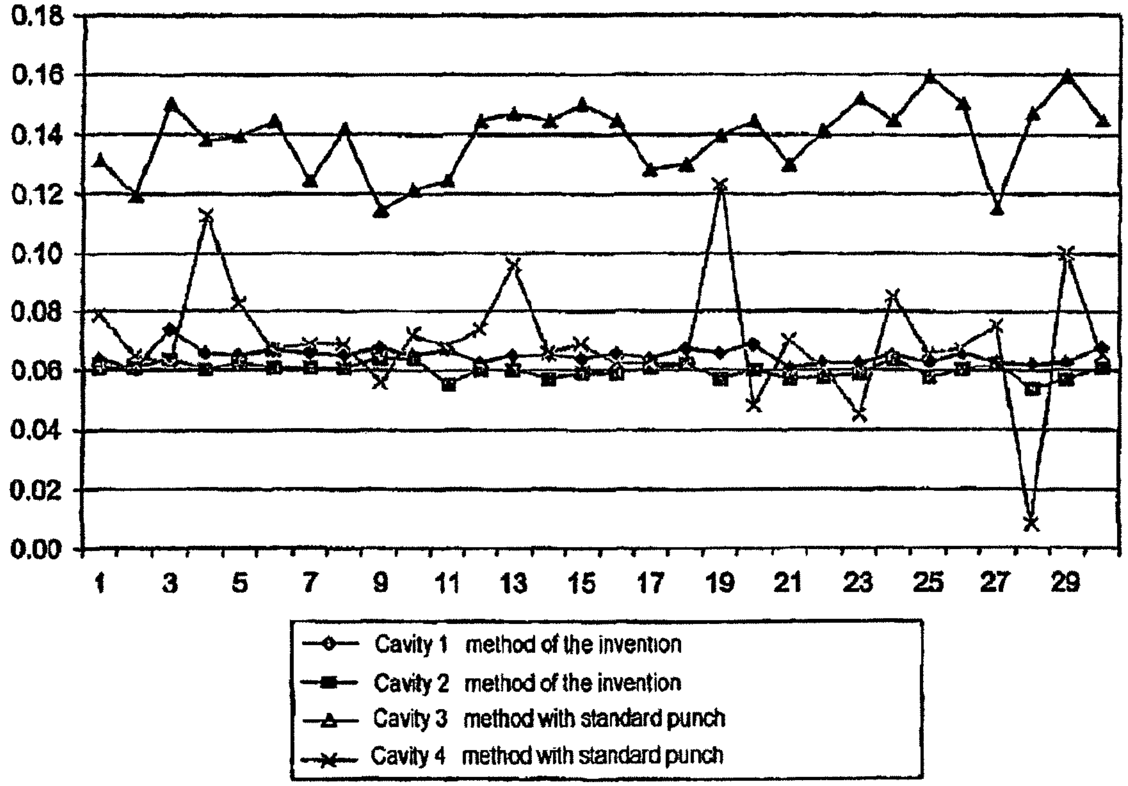
FIG. 6 is a graph showing the offset between the central axis X of the spray orifice and the central axis Y of the spray chamber for 30 heads respectively made in common mold cavities.

The graph in FIG. 6 shows, in millimeters, the offset between the axes X and Y, representing the corresponding values for 30 heads respectively made in a common mold cavity. It should be observed that with the standard methods, not only are the offset values greater, but the standard deviation is also substantial, thereby affecting the consistency of the characteristics of the spray. In contrast, the present invention guarantees values that are stable and consistent.

The table below compares the method of the invention with the standard method when performing the Droplet Size Distribution (DSD) test.

| Data | Method of the invention | Standard method |
|---|---|---|
| D10 average | 24 | 25 |
| D10 std. | 3 | 7 |
| D50 average | 57 | 60 |
| D50 std. | 11 | 21 |
| D75 average | 103 | 102 |
| D75 std. | 17 | 24 |

Sampling: 80 pushers per method.

The data in this table should be interpreted as follows: The D10 average signifies that 10% of the droplets are of size that is smaller than 24 μm with the method of the invention, and smaller than 25 μm with the standard method. It should be observed that the D10 standard deviation of the invention is substantially lower than the standard deviation using the standard method. This conclusion is also true with the D50 and D75 averages, thereby demonstrating that the present invention makes it possible to obtain a spray that is more uniform, and more consistent, and thus having improved characteristics and performance compared with the standard manufacturing method.

Figure 2:
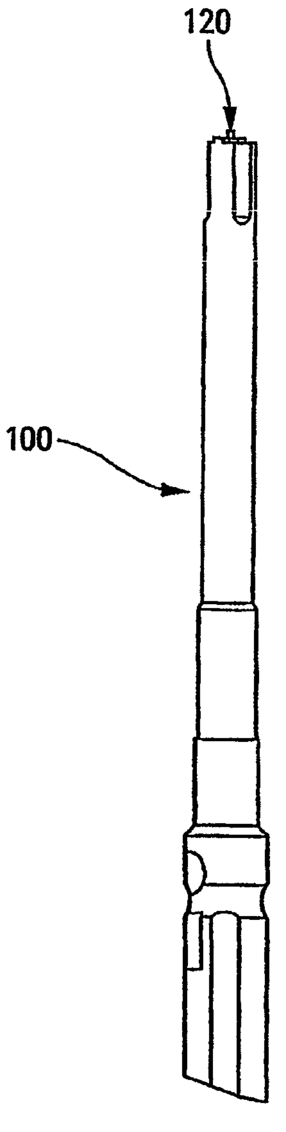
FIG. 2 is a diagrammatic side view of a core pin of a manufacturing machine constituting an embodiment of the present invention.
Figure 3:
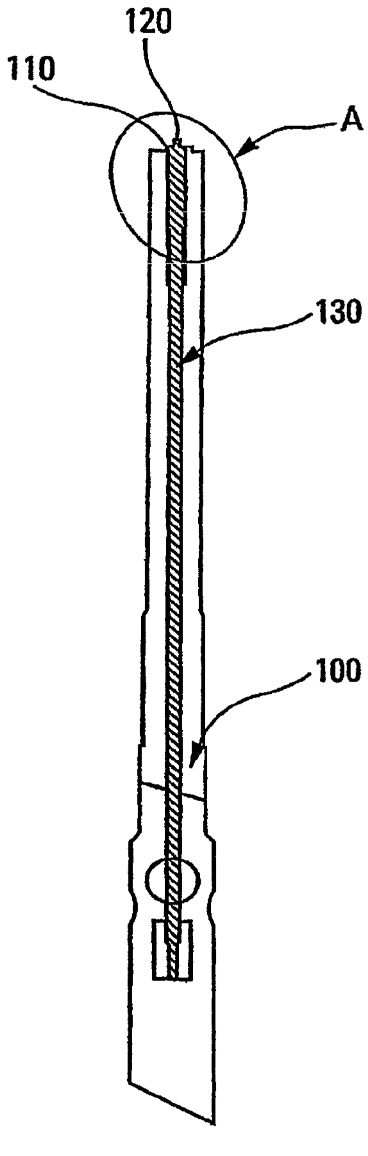
FIG. 3 is a cross-section view through the FIG. 2 pin.
Figure 4:
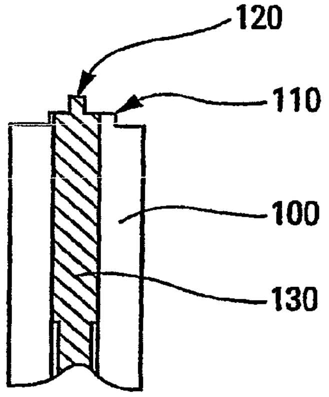
FIG. 4 is a larger-scale view of a detail A in FIG. 3.
Figure 5:
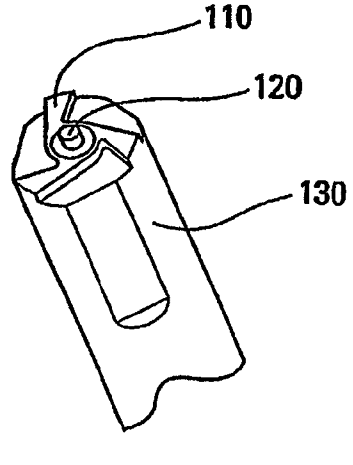
FIG. 5 is a diagrammatic perspective view of a detail A shown in FIG. 4.

Reference is made more particularly to FIGS. 2 to 5 which show part of a machine for manufacturing a head of the present invention. More particularly, FIG. 2 shows the pin 100 for placing inside the cavity for the head (not shown), and said pin defines the central expulsion channel, together with the end of the spray profile on its front face. To do this, the front face of the pin 100 has a profile 110 that is complementary to the spray profile 10 of the dispenser head. The profile 110 can include projections forming the non-radial channels 11 and the spray chamber 12, as shown more precisely in FIG. 5. In the invention, the pin 100 further incorporates the punch 120 so as to form the dispenser orifice 1. This embodiment makes it possible to guarantee a consistent offset between the axis X of the spray orifice and the axis Y of the spray chamber. Since the dimensions of the punch 120 are very small (e.g. 0.3 mm), the punch quite often breaks during molding. In order to avoid having to change the entire pin 100, it is advantageous to make the punch secured to a removable needle 130 that extends inside the pin and that is suitable for being replaced without having to change the entire pin. The needle 130 advantageously extends over a large fraction of the length of said pin 100, so as to enable it to be extracted merely by pushing on its other end, possibly via a side opening.

The present invention thus makes it possible to improve fluid dispenser heads by improving the characteristics and the performance of the spray that it dispenses, and also improving the consistency of those characteristics.

Although the present invention is described above with reference to a particular embodiment thereof, it is clear that it is not limited by said embodiment. On the contrary, any useful modifications can be applied thereto by the person skilled in the art, without going beyond the ambit of the present invention, as defined by the accompanying claims.

The invention claimed is:

1. A machine for manufacturing a spray head, the machine including at least one mold provided with at least one mold cavity of said spray head, said machine further including a core pin (100) for each mold cavity, the front face of said core pin (100) incorporating a complementary profile (110) that is complementary to a spray profile (10) of the spray head, said complementary profile (110) comprising projections configured to form non-radial channels (11) of the spray profile and a spray chamber (12) of the spray profile, said pin (100) further incorporating a punch (120) so as to form a dispenser orifice (1) in the spray head downstream of the spray profile.

2. A machine according to claim 1, in which said punch (120) is removable from said pin (100), making it possible to replace said punch (120) without having to change the pin (100).

3. A machine according to claim 2, in which said punch (120) is secured to a needle (130) that extends longitudinally inside the pin (100) over a substantial fraction of its length.

4. The machine according to claim 1, wherein the punch is at a distal end of the core pin.

5. The machine according to claim 1, wherein an end of the punch is at a distal end of the core pin and the complementary profile and the punch are substantially symmetrical about a longitudinal axis of the core pin.

6. The machine according to claim 1, wherein the punch extends orthogonally to the projections configured to form non-radial channels.

7. The machine according to claim 1, wherein a the core pin is a single core pin that comprises both the complementary profile that forms the spray profile of the spray head and the punch that forms the dispenser orifice in the spray head.

8. The machine according to claim 7, wherein a the single core pin also forms the expulsion channel leading to the spray profile and the dispenser orifice.

* * * * *